No. 786,400. PATENTED APR. 4, 1905.
L. BARNABAS.
SANITARY MILK PAIL.
APPLICATION FILED MAR. 12, 1904. RENEWED MAR. 6, 1905.

Witnesses:
Jesse A. Sheffer
John A. Weidman

Inventor:
Leander Barnabas:
By H. C. Amy
his Atty.

No. 786,400.                                                    Patented April 4, 1905.

UNITED STATES PATENT OFFICE.

LEANDER BARNABAS, OF ALBANY, NEW YORK.

SANITARY MILK-PAIL.

SPECIFICATION forming part of Letters Patent No. 786,400, dated April 4, 1905.

Application filed March 12, 1904. Renewed March 6, 1905. Serial No. 248,392.

*To all whom it may concern:*

Be it known that I, LEANDER BARNABAS, a citizen of the United States, residing at Albany, New York, have invented certain new and useful Improvements in Sanitary Milk-Pails; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to sanitary milk-pails whereby the milk may be kept clean and wholesome during and after milking.

Figure 1:
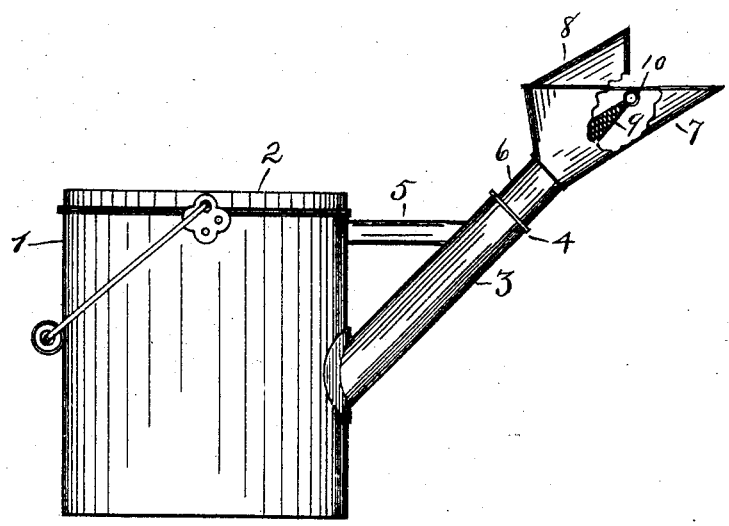
Figure 2:
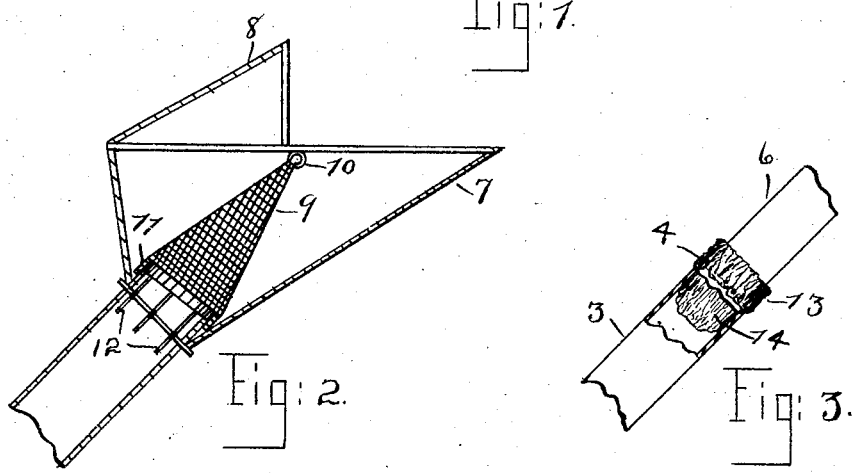

In the drawings, Figure 1 shows a side elevation, partly broken away, of my pail; Fig. 2, a vertical sectional view of its funnel, and Fig. 3 the joint of pipes 3 and 6 with a piece of cloth interposed between them to form a strainer.

The numeral 1 shows the pail, and 2 a strong cover upon which a milker may sit while milking a cow; 3, the main spout having a strengthening-rib 4, and 5 a brace to assist in sustaining the main spout.

Figure 3:
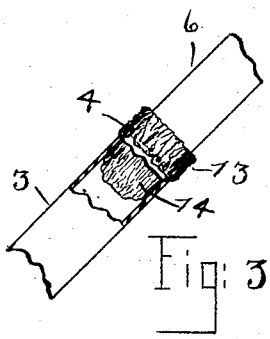

6 shows the spout to the funnel 7, which enters the main spout 3 by slipping therein, the funnel 7 having a hood 8 and a foraminous body 9 with a ringed finger-piece by which it may be removed and inserted at pleasure. This foraminous member is preferably cone-shaped and at bottom is attached to a rim 11 and has spring-wires 12 entering the upper end of spout 6, by which it is held steadily in place. Spout 6 enters the funnel 7 to a greater or less extent, and as the spring-wires 12 enter spout 6 the lower ring or rim 11 receives the end of spout 6 and makes a separable joint. This rim or ring 11 is so formed that it allows the apex of the cone to project through the funnel, so that its finger piece or ring 10 stands well away from the lower side or wall of the funnel and also forms a catch-basin around the rim 11, in which is caught any particles falling from the cow's udder and prevents it from entering the pail and leaves it where the streams from the cow's teats cannot drive it through the cone-shaped strainer and where it will seldom be disturbed by said streams of milk. Where main spout 3 is joined with spout 6, I sometimes set a cloth 13 over the end of pipe 6 and force it into spout 3, forming a strainer-bag 14, as seen in Fig. 3.

The operation is as follows: The pail 1 is used both as a milking-stool and a pail. When so used, the funnel projects under the cow's udder, so as to easily receive the streams of milk from her teats. The streams of milk are to be so directed by the milker that they will strike the inner side of the lower wall of the funnel 7 and not impinge upon the strainer or cone-shaped member 9. If some of the streams of milk happen to strike the member 9, no especial harm will be done; but that member is purposely so arranged that there shall be no need of their so doing. A little milk will lie about the base or lower rim 11 in a substantially quiet body, and any dirt falling from the cow's udder into this small pool of milk will not pass into the pail, but will remain there. A space is seen to exist between the base of the cone-shaped member 9 and its bottom ring, which will be sufficient to retain all such dirt and prevent its being driven through the cone-shaped strainer 9. This cone-shaped member is removable for purposes of cleaning and when once used and cleaned afterward may be used to pour milk through from the pail into any receptacle, thus doubly straining the milk. Shooting the milk from the cow's udder upon the slanting under surface of the funnel 7 also keeps the milk from frothing to any extent and allows it to pass as solid milk into the can, which is desirable, as it saves wasting any milk as froth or foam. After each cow is milked the strainer or cone 9 may be removed and cleansed, and any dirt settling about its lower or large end will be prevented from entering the pail by the inward-projecting end of the spout 6, where it projects upward and into the funnel 7. The hood 8 also keeps dust and dirt from the cow and milker's clothes from entering the funnel 7.

Having described my invention so that those skilled in the art may know how to make and use the same, what I claim, and desire to secure by Letters Patent, is—

In a milk or other pail a spout composed of a plurality of sections arranged telescopically and removably and attached to the side wall of the pail and emptying into it at a point at or below its vertical center, one of said spout-sections having a flaring open mouth, the mouth or opening lying in a horizontal plane and partly covered by an upwardly-flared hood, the mouth having an inclined, removable, cone-shaped strainer set therein and arranged so that when in its normal position the streams of milk projected therein in the act of milking an animal will not impinge on the strainer at right angles substantially as described.

In testimony whereof I affix my signature in presence of two witnesses.

LEANDER BARNABAS.

Witnesses:
    JESSE A. SHEFFER,
    JOHN A. WEIDMAN.